United States Patent [19]
Inoue

[11] Patent Number: 4,639,741
[45] Date of Patent: Jan. 27, 1987

[54] BLOCK-DIVIDED DRIVING OF A THERMAL PRINTHEAD

[75] Inventor: Takashi Inoue, Asaka, Japan

[73] Assignee: Ricoh Company, Ltd., Tokyo, Japan

[21] Appl. No.: 755,579

[22] Filed: Jul. 16, 1985

[30] Foreign Application Priority Data

Jul. 16, 1984 [JP] Japan ................................ 59-147148

[51] Int. Cl.4 ................................................ G01D 15/10

[52] U.S. Cl. ................................ 346/76 PH; 400/120; 364/519

[58] Field of Search .................... 346/76 PH; 400/120; 214/216; 364/519

[56] References Cited

U.S. PATENT DOCUMENTS 4,415,408 11/1983 Sugiura .......................... 346/76 PH
4,536,774 8/1985 Inui et al. ........................ 346/76 PH

*Primary Examiner*—Arthur G. Evans
*Attorney, Agent, or Firm*—Oblon, Fisher, Spivak, McClelland & Maier

[57] ABSTRACT

A thermal printhead driving system of the present invention is to be applied to the case in which a print line is divided into two or more blocks and the print line is driven block by block from one end to the other in sequence. In accordance with the present driving system, a dot of interest is monitored as to whether it is a dot at each end of a block or not, and this information is used to differently define an address which is used to access a predetermined table of driving energy levels. In the preferred embodiment, the address is so defined to access an increased energy level if the dot of interest is an end dot of a block thereby providing an increasing level of driving energy to the end dot, so that a printed image high in quality can be obtained even with a block driving scheme.

4 Claims, 4 Drawing Figures

BLOCK-DIVIDED DRIVING OF A THERMAL PRINTHEAD

BACKGROUND OF THE INVENTION

1. Field of the Invention

This invention generally relates to a line-type thermal printhead for use in a thermal printer of the direct printing type employing heat-sensitive paper or of the transfer type employing heat-sensitive ink ribbon and plain paper, and, in particular, to a driving system of a line-type thermal printhead in which the entire scanning line is driven as divided in blocks sequentially from one end to the other.

2. Description of the prior art

A line-type thermal printhead is well known in the art and it is commonly used in a thermal printer of the direct printing type in which use is made of heat-sensitive paper on which printing is carried out directly by the thermal printhead and of the transfer printing type in which use is made of heat-sensitive ink ribbon which is inserted between the thermal printhead and plain paper to effect printing on the plain paper. As is well known in the art, such a line-type thermal printhead includes a plurality of heat-producing elements, typically comprised of electrical resistors, arranged in the form of a single array as spaced apart from each other at a predetermined pitch, through which electrical current is selectively passed under control of a driving system in accordance with an image signal thereby printing a dot-form image on a recording medium.

In such a line-type thermal printhead, the plurality of heat-producing elements arranged in the form of a single line are divided into a plurality of blocks and the blocks, each including a predetermined number of heat-producing elements, are activated one after another in sequence. FIG. 2 illustrates how such a block driving of a line-type thermal printhead is carried out. In FIG. 2, there are shown only two print lines, i.e., previous line and current line; however, it is to be noted that, as is well known in the art, since a sheet of recording paper is typically moved relative to the thermal print-head in the direction normal to the line of arrangement of the heat-producing elements of the thermal printhead, there are, in fact, printed a number of print lines in front of the current print line. In FIG. 2, each circle indicates a pixel which is to be printed by the corresponding heat-producing element of the thermal printhead, and, as also shown in FIG. 2, the entire scan line is divided into a plurality of blocks and the blocks are driven one after another from one end to the other, in which the heat-producing elements of one block are selectively activated in accordance with the corresponding portion of an image signal.

In FIG. 2, the end dots of one block are indicated as shaded circles in the current line. These block end dots are less affected thermally by the image information of previous line and the adjacent dots of the current line as compared with the other dots which are not block end dots. And, thus, these block end dots tend to be lower in temperature when activated, which causes locally decreased image density thereby resulting in a printed image of poor quality. Such a disadvantage becomes particularly pronounced when thermal printing is effected in a half-tone mode, e.g., a multi-density level modulation mode (in the case of direct printing type) or an area modulation mode (in the case of transfer printing type).

SUMMARY OF THE INVENTION

It is therefore a primary object of the present invention to obviate the disadvantages of the prior art as described above and to provide an improved system for driving a line-type thermal printhead.

Another object of the present invention is to provide an improved system for driving a line-type thermal printhead as divided in blocks from one block after another in sequence.

Another object of the present invention is to provide an improved system for driving a block-divided line-type thermal printhead capable of producing a printed image high in quality.

A further object of the present invention is to provide an improved system for driving a block-divided line-type thermal printhead simple in structure and high in performance.

Other objects, advantages and novel features of the present invention will become apparent from the following detailed description of the invention when considered in conjunction with the accompanying drawings.

DESCRIPTION OF THE PREFERRED EMBODIMENTS

In order to attain the above-mentioned objects and other objects, in accordance with the present invention, there is provided a driving system for driving a thermal printhead block to block in sequence, in which a modified level of driving energy is applied to each of the block end dots when it is to be activated in accordance with an image signal. In the preferred embodiment, the modified level of driving energy applied to the block end dot is higher than a reference energy level applied to the dot other than the block end dot.

Figure 3A:
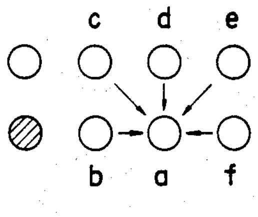
FIGS. 3*a* and 3*b* are schematic illustrations which are useful for explaining how the thermal influence differs between the block end dot and the intermediate dot.
Figure 3B:
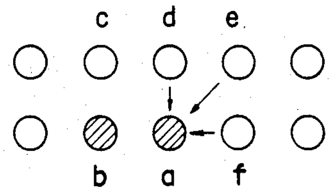

Referring first to FIGS. 3*a* and 3*b*, the basic concept of the present invention will be described. In FIGS. 3*a* and 3*b*, a dot of interest is indicated by a, and the adjacent dots on both sides of the dot of interest a are indicated by b and f, respectively, and, those dots which correspond to the dots b, a and f in the current line and which are located in the previous line are indicated by c, d and e, correspondingly. And, thus, the dot d in the previous line corresponds to dot a in the current line and these two dots d and a are printed by the same heat-producing element of a thermal printhead as staggered in time. The same arguments hold true between the dots c and b and between e and f, respectively. It should further be noted that, in FIGS. 3*a* and 3*b*, the block end dots are indicated by shaded circles, and, thus, there is shown only one block end dot in the case of FIG. 3*a*, whereas, there are shown two block end dots b and a in the case of FIG. 3*b*.

As shown in FIG. 3*a*, if the dot of interest a is an intermediate dot and not a block end dot, it is thermally affected not only by the adjacent dots b and f, which are activated at the same time with the dot of interest a, but also by the three corresponding dots c, d and e in the previous line. On the other hand, as shown in FIG. 3*b*, if the dot of interest a is a block left end dot, then it is thermally affected by the right adjacent dot f, which is activated at the same time with the dot of interest a, and the corresponding dots d and e in the previous line. Similarly, although not shown, if the dot of interest a is a block right end dot, then it is thermally affected by the left adjacent dot b and the corresponding dots c and d in the previous line. In this manner, the level of thermal influence received by the dot of interest a differs between the case in which the dot of interest a is a block end dot and the case in which the dot of interest a is an intermediate dot. And, if the dot of interest a is a block end dot, it is less thermally affected as compared with the case in which the dot of interest a is an intermediate dot. In other words, the dot of interest a in the case of a block end dot receives a lower level of thermal influence as compared with the dot of interest a in the case of an intermediate dot. Accordingly, the end block dot tends to be lower in temperature when it is activated by the same driving current due primarily to this reduced thermal influence, which would cause a local reduction in image density. Based on this finding, in accordance with the principle of the present invention, there is provided a driving system of a block-divided line-type thermal printhead, which is so structured to apply an increased level of driving energy when a block end dot is to be activated in block driving.

Figure 1:
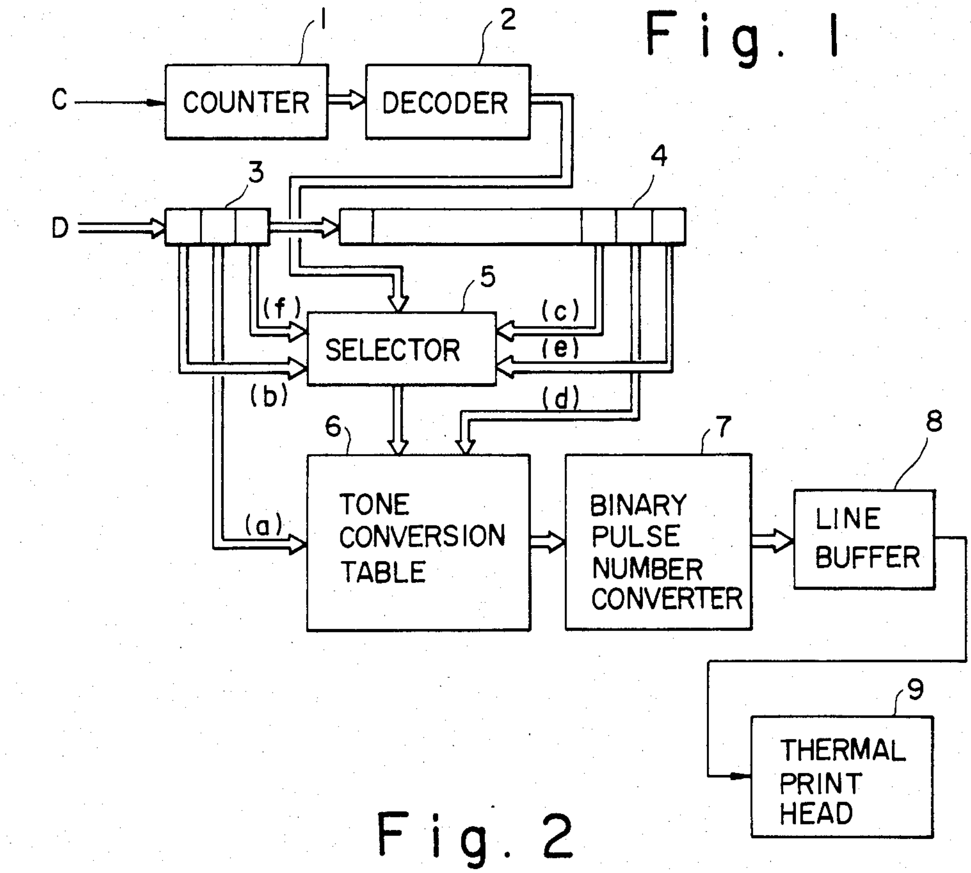
FIG. 1 is a block diagram showing a system for driving a thermal printhead constructed in accordance with one embodiment of the present invention.
Figure 2:
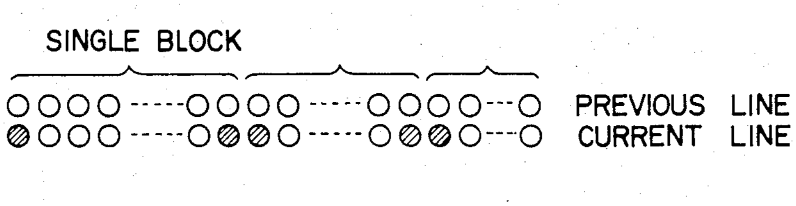
FIG. 2 is a schematic illustration showing the two print lines, i.e., previous and current lines, which are printed in a block driving manner.

Referring now to FIG. 1, there is shown a system for driving a thermal printhead constructed in accordance with one embodiment of the present invention. As shown, to the driving system of FIG. 1 is applied a printing data D of image signal which includes one bit or a plurality of bits for each pixel and a clock signal C which is in synchronism with the image signal D. The driving control system of FIG. 1 includes a counter which receives the clock signal C and a decoder 2 connected to the counter 1 for receiving a count therefrom. The counter 1 and the decoder 2 in combination detects a block end dot when a thermal printhead 9 having a plurality of heat-producing elements (not shown) arranged in the form of a single line is to be driven as divided in blocks.

The driving control system of FIG. 1 also includes a three-dot buffer 3 which is connected to receive the image signal D and which can store three dots of image information to be printed in the current print line, i.e., b, a and f, wherein each dot may be comprised of one bit or a multiple of bits. The three-dot buffer 3 has its output terminal connected to an input terminal of a block line-buffer 4 capable of storing one block of image information. In the illustrated embodiment, the line-buffer 4 stores the image information of the corresponding block in the previous line, so that it contains the data for the corresponding three dots c, d and e in the previous line. Also provided in the driving control system of FIG. 1 is a selector 5 which receives a decoded data from the decoder 2, in which the decoded data indicates as to whether the dot of interest a now stored in the center position of the three-dot buffer 3 is a block end dot or not. The selector 5 is also connected to receive data for the adjacent dots b and f from the three-dot buffer 3 and data for the dots c and e of the previous line corresponding to dots b and f in the current line from the block line-buffer 4.

In this manner, the selector 5 receives four data for the dots b, f, c and e from the buffers 3 and 4 and an output data indicating as to whether the dot of interest a is a block end dot or not from the decoder 2, and it supplies these data selectively as its output to a tone conversion table 6 as an address for selecting a particular driving energy level. In the preferred mode of this embodiment, if the output from the decoder 2 indicates that the dot of interest a is an intermediate dot and not a block end dot, then the selector 5 allows to pass all of the data for the dots b, f, c and e to be supplied as its output to the tone conversion table. On the other hand, if the output from the decoder 2 indicates that the dot of interest a is a block left end dot, then the selector 5 sets the data for dots b and c to zero and supplies only data for dots e and f as its output to the tone conversion table 6 to be used as an address. Furthermore, if the output from the decoder 2 indicates the dot of interest a to be a block right end dot, then the selector 5 sets the data for dots e and f to be zero thereby supplying only data for dots b and c as its output to the tone conversion table 6, so that the data for dots b and c define an address to be used in the tone conversion table 6 in this case. This function is tabulated below for convenience.

| Output from Decoder 2 | Output from Selector 5 | | | |
|---|---|---|---|---|
| Left end dot | 0 | 0 | e | f |
| Right end dot | b | c | 0 | 0 |
| Intermediate dot | b | c | e | f |

Since the tone conversion table 6 receives data for dots a and d directly from the buffers 3 and 4, respectively, the data supplied from the selector 5, together with data for dots a and d, define an address for finding a particular energy level to be used in driving the corresponding heat-producing element in the thermal printhead 9. Accordingly, the address to be used in the tone conversion table 6 differs depending on the output supplied from the selector 5. The tone conversion table 6 is connected to supply its addressed information on driving energy level to a binary pulse number converter 7 where the driving energy level information supplied from the table 6 is converted into the corresponding number of current pulses which is then once stored in a line-buffer 8 for use in block driving the thermal printhead 9. It is to be noted that if each of the dot data a through f is comprised of n bits, then the output from the selector 5 is comprised of 4n bits and thus an address of the tone conversion table 6 is comprised of 6n bits. In this manner, an address to be used in accessing a particular driving energy level stored in the table 6 is differently determined depending on the output from the selector 5, i.e., depending on as to whether the dot of interest a is an end dot or not, so that a suitably modified driving energy level can be supplied to each of the heat-producing elements of the thermal printhead 9 at all times thereby producing no local reduction in image density.

Now, another embodiment of the present invention will be described. This embodiment is structurally identical to the previous embodiment excepting that the block line-buffer 4 is removed. It is often the case that the thermal influence from the previous line is significantly lower than the thermal influence from the adjacent dots so that there are cases in which the thermal influence from the previous line can be neglected practically. This happens, for example, in the case where the scanning line is divided into a relatively large number of blocks. In this case, if the dot of interest a is an end dot, it is thermally affected by either one of the adjacent dots b and f; on the other hand, if the dot of interest a is an intermediate dot, then it is thermally affected by both of the adjacent dots b and f. And, thus, also in this case, the energy level to be applied for a heat-producing element corresponding to the dot of interest a which is located at the end of a block must be increased to compensate a reduced thermal influence.

Here, one particular scheme for compensating the thermal influence of the current line will be described in detail. Let us assume that there are four tone levels when driving one dot individually.

$$0, L_1, L_2, L_3$$

It should be understood that the tone level or density increase as the subscripted number increases. And, the level of driving energy to be applied for each of these four tone levels are designated by $$0, e_1, e_2, e_3$$

and, also here, the energy level increases as the subscripted number increases. Now, these energy levels are indicated in the form of a code in the following manner, using two bits since there are four levels.

00, 01, 10, 11

Additional bit is added for each code for indicating as to whether the adjacent dot b or f is in the same block or not. And, thus, if 0 is added for the case of the adjacent dot b or f being not in the same block, the above-described codes become 000, 001, 010, 011 and, on the other hand, if 1 is added for the case of the adjacent dot b or f being in the same block, we have 100, 101, 110, 111.

In summary, the tone conversion table 6 may be constructed in the following manner.

| dot a | | Compensating Energy Amount | | | |
|---|---|---|---|---|---|
| | | 0 | $e_1$ | $e_2$ | $e_3$ |
| dot b | dot f | | | | |
| 000 | 000 | E0,0 | E0,1 | E0,2 | E0,3 |
| 000 | 001 | E1,0 | E1,1 | E1,2 | E1,3 |
| 000 | 010 | E2,0 | E2,1 | E2,2 | E2,3 |
| — | — | — | — | — | — |
| 000 | 111 | — | — | — | — |
| 001 | 000 | — | — | — | — |
| — | — | — | — | — | — |
| 111 | 111 | E63,0 | E63,1 | E63,2 | E63,3 |

It should thus be apparent from the above table that dot a receives one of the driving energy levels 0, $e_1$, $e_2$ and $e_3$ when it is activated by itself, but since the tone conversion table 6 also receives data for dots b and f, which are the adjacent dots, a combination of data for those dots b and f defines an address to select one of the compensating energy amount indicated by $E_{i,j}$ which is added or subtracted to the energy level 0, $e_1$, $e_2$ or $e_3$ selected to produce an appropriate energy level to be applied to the thermal printhead 9.

As described above in detail, in accordance with the present invention, even if a single scan line is driven block by block in sequence, the block end dots are always insured to be driven at a proper energy level taking into account a differing thermal effect from the surrounding and, if necessary, the corresponding dots in the previous line, so that thermal printing can be carried out optimally at all times without producing a local reduction in image density.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A system for driving a line-type thermal printhead block to block in sequence from one end to the other, comprising:

detecting means for detecting as to whether a pixel data for a dot of interest is for an end dot of a block, said detecting means supplying a first output indicating as to whether said dot of interest is an end dot of a block or not;

address forming means for forming an address using pixel data at least for two adjacent pixel data on both sides of said pixel data for said dot of interest;

storing means for storing a predetermined table of energy levels, said storing means receiving said first output from said detecting means and said address from said address forming means for accessing a particular energy level in said table and supplying as its output a driving energy level for said dot of interest; and means for driving said dot of interest in said thermal printhead in accordance with said driving energy level supplied from said storing means.

2. The system of claim 1 wherein said address forming means includes a three-dot buffer which receives an image signal and temporarily stores image data for three consecutive dots with a center dot defining said dot of interest.

3. The system of claim 2 wherein said address forming means further includes selecting means which is connected to receive said first output from said detecting means and image data from both of end dots of said three-dot buffer and which is connected to supply said address to said storing means.

4. The system of claim 3 wherein said address forming means further includes a line-buffer which is connected to receive said image signal through said three-dot buffer for temporarily storing therein said image data for a predetermined length and which supplies pixel data for the corresponding end dots in the previous line to said selecting means to be used in forming said address and also pixel data for the dot in the previous line corresponding to said dot of interest to said storing means.

* * * * *